United States Patent [19]
Mitchell et al.

[11] 3,790,250
[45] Feb. 5, 1974

[54] THERMALLY-ACTIVATED OPTICAL ABSORBER

[75] Inventors: Dean L. Mitchell, Oxon Hill, Md.; Stephen G. Bishop, Arlington; Craig Taylor, Alexandria, both of Va.

[73] Assignee: The United States of America as represented by the Secretary of the Navy, Washington, D.C.

[22] Filed: Aug. 25, 1971

[21] Appl. No.: 174,828

[52] U.S. Cl............................ 350/160 R, 106/47 Q
[51] Int. Cl.............................................. G02f 1/36
[58] Field of Search.. 106/47 R, 47 Q; 350/1, 160 R

[56] References Cited
UNITED STATES PATENTS

| | | | |
|---|---|---|---|
| 3,020,406 | 2/1962 | Whitney........................ | 350/160 R |
| 3,025,763 | 3/1962 | Schwartz et al............... | 350/160 R |
| 3,484,722 | 12/1969 | Barker et al................... | 350/160 R |
| 3,655,255 | 4/1972 | Krause et al................... | 106/47 X |

OTHER PUBLICATIONS

Andriesh et al., "Local Levels in Vitreous $Ti_2SeAs_2Te_3$" Soviet Physics—Solid State, Vol. 5, No. 5, November 1963, pages 1063–1065.

Goriunova et al., "New Glass–Like Semiconductors," Academy of Sciences, U.S.S.R. Bulletin, Physical Series 1956, pages 1372–1376.

Savage et al., "Chalcogenide Glasses – A State of the Art Review," Infrared Physics, Vol. 5, 1965, pages 195–204.

Primary Examiner—Ronald L. Wibert
Assistant Examiner—F. L. Evans
Attorney, Agent, or Firm—R. S. Sciascia; Arthur L. Branning; Philip Schneider

[57] ABSTRACT

An optical device comprising a glassy material which exhibits temperature-dependent optical absorption properties. The intensity of radiation beams which are transmitted through the material is thermally controlled so that the device can attenuate, modulate, or become opaque to the transmitted radiation.

9 Claims, 5 Drawing Figures

INVENTORS
D. L. MITCHELL
S. G. BISHOP
P. C. TAYLOR

INVENTORS
D. L. MITCHELL
S. G. BISHOP
P. C. TAYLOR

THERMALLY-ACTIVATED OPTICAL ABSORBER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a thermally regulated optical absorber. More particularly, this invention relates to an optical device utilizing a semiconducting material which has optical absorption properties that are a function of temperature over broad spectral ranges.

2. Description of the Prior Art

The development of lasers operating in the infrared region of the spectrum has brought about an accompanying need for efficient methods of controlling the laser beam. An optical device which controls the intensity of a transmitted light beam may be described as a light-valve in analogy to the control device for fluid flow. The light-valve can perform the control functions of a modulator (variation of the intensity of the beam by an externally applied ac signal), attenuator (reduction of beam intensity to a desired level) and a shutter (interruption of the beam by external control signal or by self activation by the beam itself). Such a light-valve is herein understood to be a device which controls a transmitted light beam in contrast to devices which control a reflected beam. One class of light valves, which includes the Kerr cell, depends on an active medium to alter the state of polarization of initially polarized light. These valves require careful and expensive crystal growth for solid state devices, require polarized light, are not broad band and cannot operate as shutters self-activated by an incident light beam.

Another class of optical modulators for infrared radiation includes devices which alter the polarization of intensity of reflected light. U.S. Pat. No. 3,484,722 discusses an optical modulator which operates in the infrared. In this device, the active medium undergoes a phase transition at a fixed temperature with a consequent change in reflectivity. This device cannot operate as a true light valve since it is not a transmission device and cannot reduce the intensity of the reflected beam to a predetermined small value. It also must be operated in a narrow temperature range near the phase transition temperature of the active medium.

SUMMARY OF THE INVENTION

According to the present invention, there is provided an optical device that can operate as an attenuator, modulator, or self-activating shutter to incident beams of electromagnetic radiation over a broad range of wavelengths. It utilizes a glassy semiconducting material characterized as having a dc conductivity of at least about $10^{-4}$ ohm$^{-1}$cm$^{-1}$, a relaxation time $\tau$ of less than about $^{-13}$ sec, and an intrinsic dc conductivity that provides an exponential change of optical absorption with changes in temperature. The material is provided with temperature control means so that the temperature of the material can be maintained at predetermined levels or modulated to effect the desired optical absorption. The device has the advantage of simplicity since only a temperature change in a single layer of material is necessary for operation. Additionally, it is intrinsically stable and inexpensive since glasses are not sensitive to small compositional or structural changes and can be fabricated by well known processes such as heat-pressing, casting, and molding.

DESCRIPTION OF THE PREFERRED EMBODIMENTS

In the consideration of the present invention and for clarity of description, a brief explanation of the physics of the present invention is herein provided. The present invention is based on the discovery that semiconducting glasses have a temperature-sensitive optical absorption which can extend from dc to the optical band edge in the near infrared region of the spectrum, provided that the dc conductivity of these glasses is sufficiently large. This broad band temperature-sensitive absorption is characteristic of any intrinsic semiconductor having a sufficiently short free carrier scattering time ($\tau$ in sec). An intrinsic semiconductor is defined as a material whose dc conductivity increases exponentially with temperature at a rate proportional to an energy gap. The free carrier optical absorption for such a material can be estimated from the following equation:

$$n\alpha = 120\,\pi\,\sigma \qquad (1)$$

where $n$ is the index of refraction of the material, $\alpha$ is the absorption coefficient in cm$^{-1}$, and $\sigma$ is the conductivity in ohm$^{-1}$cm$^{-1}$ at the frequency of interest. The glassy semi-conducting materials useful in the present invention exhibit a free carrier optical absorption (or conductivity) that is essentially independent of frequency ($\omega$ in sec$^{-1}$) until it is equal to the reciprocal of the current carrier scattering (relaxation) time $\tau$, i.e., until $\omega\tau \approx 1$. At this point the absorption (or conductivity) decreases rapidly with increasing frequency. Short scattering or relaxation times are characteristic of disordered materials such as glasses.

Glasses appropriate for use with the present invention contain various amounts of the elements As, Se, Tl, Ge, Si, Sb, Te and S and can exist for a broad range of compositions. Appropriate techniques for preparation and various composition regions applicable to the semiconducting glasses useful in the present invention are described by Pearson in *Modern Aspects of the Vitreous State*, Vol. 3, pp. 29–58, Butterworth and Co. Ltd., 1964. Certain of the chalcogenide glasses have been found to be especially suitable for use in the present invention because they do not readily devitrify at operating temperatures, they show a strong change of optical absorption with temperature, and they have dc conductivities of the order of $10^{-4} \text{ohm}^{-1}\text{cm}^{-1}$ or greater with relaxation times of less than $10^{-13}$ sec.

Figure 3:
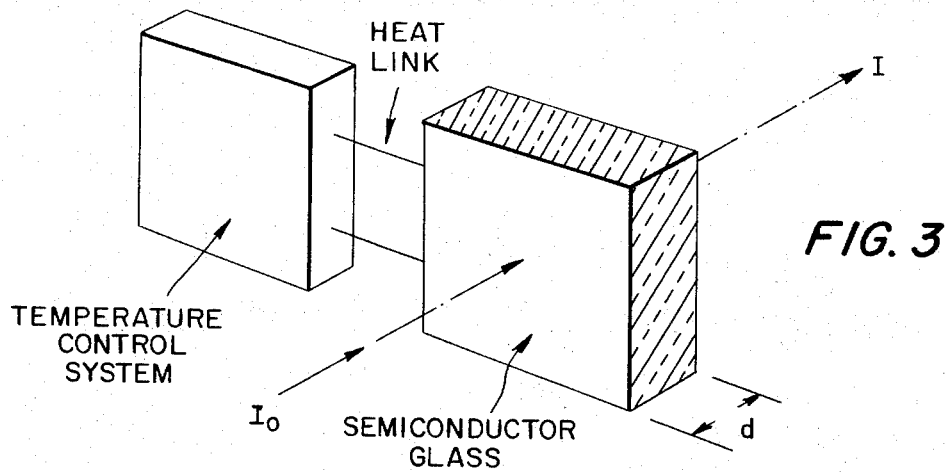
FIG. 3 schematically illustrates the essential elements of the present invention.

FIG. 3 sets forth the essential elements of the present invention. Incident radiation $I_o$ is shown entering a semiconducting glass element of d thickness and a temperature control system is shown coupled to the glass by a heat link. The temperature control system is utilized to maintain or vary the glass temperature in accordance with information signals by heating or cooling the glass via the heat link. The system includes, but is not limited to, heating and cooling means plus temperature sensors and regulation means well known in the art. The heating means may comprise, for example, electrical resistive components.

The transmitted intensity through the glass element of FIG. 3 is given by the following equation:

$$I = I_o e^{-\alpha d} \quad (2)$$

where $I_o$ is the incident intensity, d is the glass thickness in cm, and $\alpha$ is the absorption constant. The absorption constant is exponentially dependent on temperature in the glasses of interest. Thus, $$\alpha = \alpha_o e^{-T_o/T} \quad (3)$$

where $T_o$ is the ambient temperature and $T$ the temperature of the device. If one assumes that all of the absorbed intensity heats up the sample (i.e., neglecting heat flow), the equation yields $$\alpha = \alpha_o e^{t/\tau} \quad (4)$$

where $t$ is time and $\tau$ is a characteristic turn-off time given by $$\tau \approx C_v d\, T_o / I_o \quad (5)$$

where $C_v$ is the specific heat of the glass element.

In the glass of the present invention where $\alpha d \approx 1$ at $T = T_o$, $\tau$ is 10 sec. per joule of incident energy. Thus, if 100 joules of energy are incident on the device, the characteristic turn-off time will be 0.1 sec. It can be seen that the ambient operating temperature $T_o$ is an important parameter in the design of the device, since normally the element should be biased at $\alpha d \approx 1$ for $T = T_o$. From Eqs. (3) and (1), it is apparent that the dc conductivity controls the value of $\alpha$ at $T = T_o$.

To illustrate the practice of the present invention, a high conductivity semiconducting glass sheet can be positioned in the path of a beam of radiation and made to absorb a fraction of the transmitted beam. Where the incident radiation has insufficient intensity to heat the glass, the temperature changes can be effected by an external heater, or by a current flow through the glass sheet itself in accordance with an information signal. If the radiation is too intense and/or ambient conditions are too hot, cooling means may be necessary to control the temperature and, also, to prevent possible devitrification of the glass. The beam can be modulated by varying the temperature with a variable heat source. The temperature can also be held at some fixed level which allows a fixed attenuation. If the beam is sufficiently strong, then self-absorption will heat the glass sheet causing increased absorption and thermal runaway until the beam is totally absorbed and heat conduction from the glass sheet limits the temperature rise. To avoid deformation of the device at temperatures in excess of the softening point of the glass, the absorbing element can be sandwiched between layers of heat-transmitting, high-melting-point material in a rigid sealed mounting.

Figure 1:
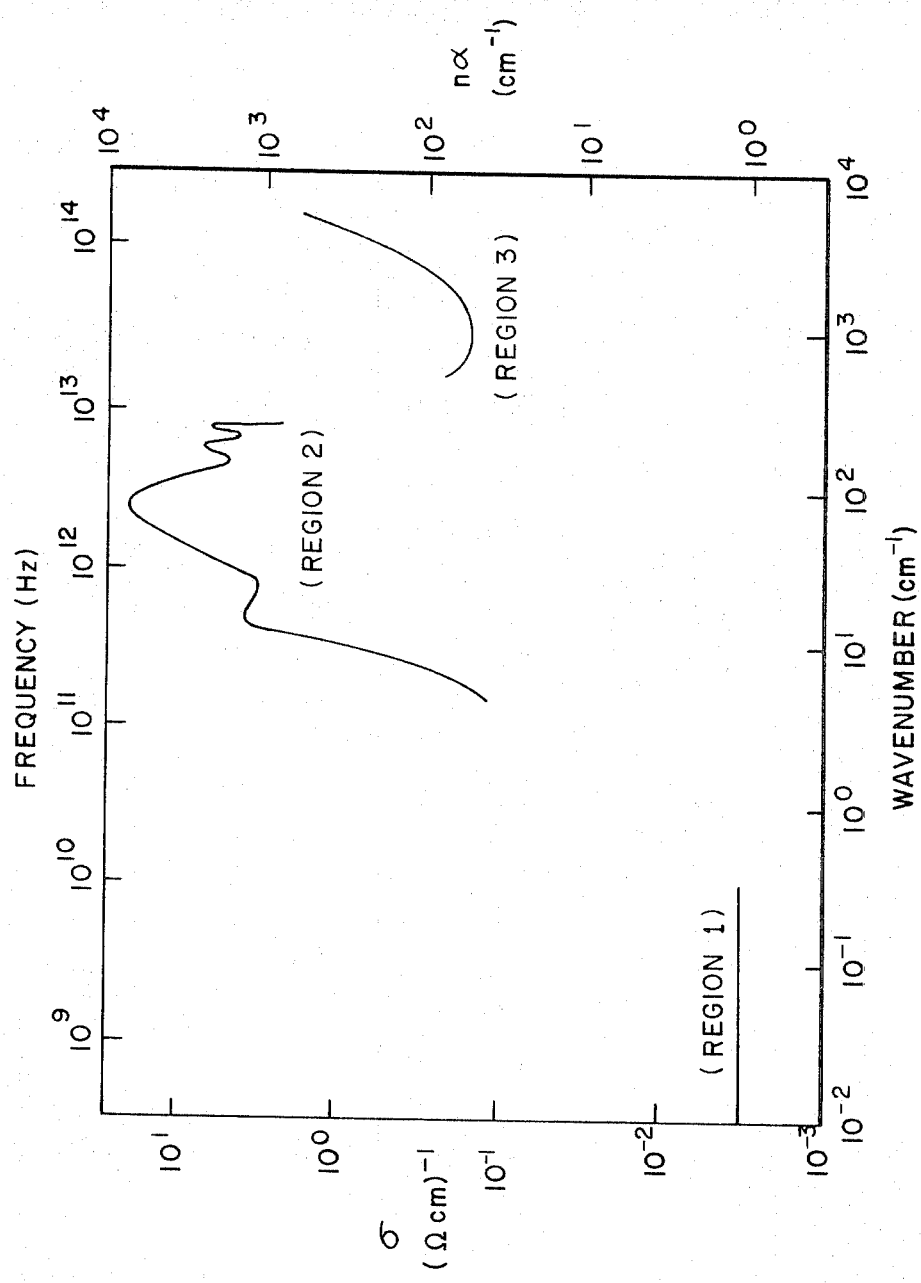
FIG. 1 is a graph showing the absorption coefficient (multiplied by the index of refraction n) as a function of angular frequency for a high conductivity glass at room temperature.

Referring now to the drawings and, more particularly to FIG. 1, there is shown graphically how the optical absorption coefficient (multiplied by index of refraction $n$) for $Tl_2SeAs_2Te_3$ glass at room temperature (200°K) varies with frequency. The absorption (or conductivity) is approximately constant with frequency from dc to $10^{10}$ Hz, (Region 1) as evidenced by the straight line which represents the measured dc value. The region from $10^{11}$ to $10^{13}$ Hz (Region 2) is a region of strong vibrational absorption which thereby limits the use of the invention in this range. However, the region from $10^{13}$ to $10^{14}$ Hz (Region 3) again exhibits a constant absorption which is related to the absorption in the first region as is seen in FIG. 2.

Figure 2:
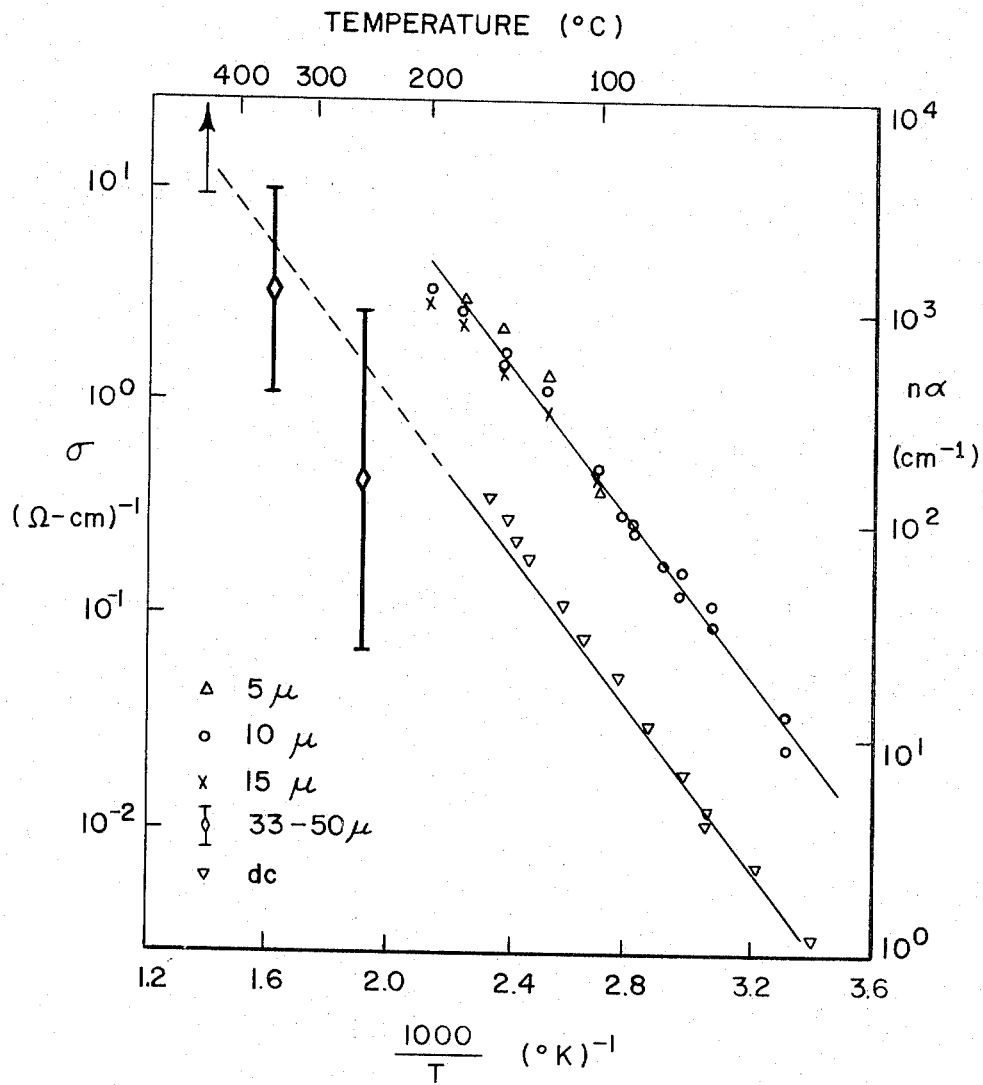
FIG. 2 is a graph showing the exponential variation of the optical absorption (multiplied by n) with temperature.

FIG. 2 demonstrates the exponential temperature dependence of the dc conductivity and the infrared optical absorption (or conductivity) measured in the middle of Region 3. FIG. 2 shows that the absorption coefficient is a strong (exponential) function of temperature in both regions so that small changes in temperature can cause large changes in the transmitted intensities. This sensitivity to small temperature changes is enhanced by the exponential dependence of the transmission through the glass on the absorption coefficient $\alpha$ as shown by equation (2).

Figure 4:
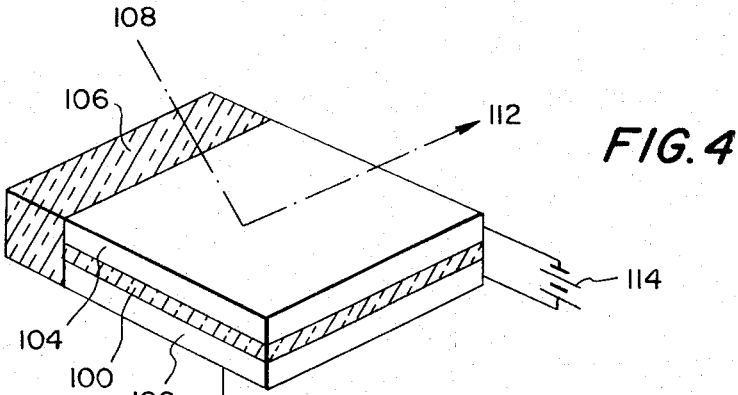
FIG. 4 is a perspective view of the invention shown as a self-activated shutter.

A specific embodiment of the present invention as a self-activated shutter is shown in FIG. 4. The active glass layer 100 is a chalcogenide glass selected from the system $Tl_2(Se_xTe_{1-x})-As_2(Se_yTe_{3-y})$ where $x$ varies between 0 and 1 and $y$ varies between 0 and 3. This glass is sealed between two transparent windows 102 and 104 which also serve as heat conductors to carry absorbed power to the heat sink 106 and as electrical conductors to apply current from voltage source 114 to the glass layer 100 to maintain its temperature at, for example, about 50°C. The windows could be made of germanium, silicon or other transparent semiconductors. The thickness of the windows 102 and 104 and their arrangement with the heat sink 106 are adjusted so that approximately 1 watt of heater power is required to maintain the 50°C temperature in the glass layer for a 1cm² cross-sectional area. Under these conditions the transmitted beam 110 is approximately 25 percent of the incident beam 108. Approximately 60 percent of the loss is by reflection beam 112 from the germanium windows, however, such may be reduced by anti-reflection coatings. The remainder is due to absorption in the glass which initiates thermal runaway. Directing optical beam 108 of about 100 watts/cm² of 10 $\mu$ laser radiation toward the device will feed energy into the glass layer at an initial rate of approximately 10 calories per second. Since the absorbed energy depends exponentially on the absorption constant which in turn depends exponentially on temperature, the energy absorbed from the beam will initiate thermal runaway until all the beam is absorbed and the resulting heat energy is conducted away to the heat sink 106. For the example chosen, the characteristic time for turn-off is approximately 0.02 second. These values are given as examples since the operating characteristics of the device can be altered over a wide range by adjusting the heat linkage to the heat sink, the thickness of the glass layer and the applied voltage.

Figure 5:
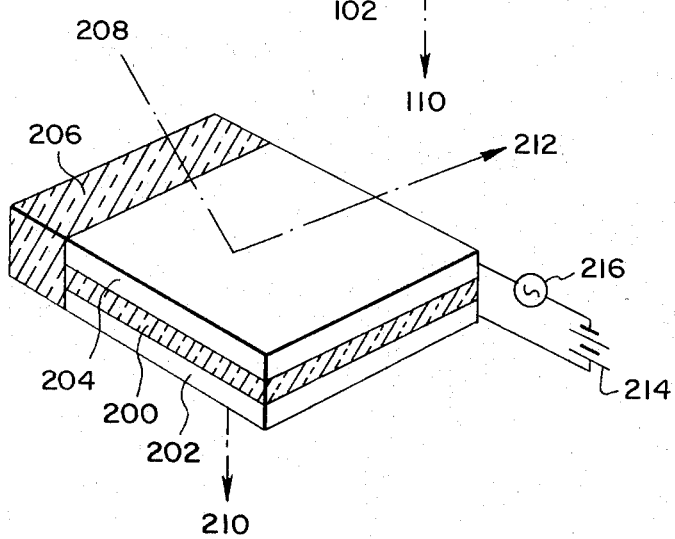
FIG. 5 is a perspective view of another embodiment of the invention shown as a modulator or attenuator.

A second embodiment of the invention as a modulator or attenuator is shown in FIG. 5. The configuration, for convenience, is taken as the same as in FIG. 3 except for the modulation source 216 in series with the bias voltage source 214, which, in turn, is electrically connected to windows 202 and 204 which serve as heat conductors and electrical conductors. The description of the light-valve as an attenuator proceeds as before. An initial beam 208 with small enough intensity ($I_o <$ 1 watt/cm$^2$) not to cause self-heating is incident on the device. The thickness of the glass layer 200 is about ½ mm and the heat input is adjusted so that 1 watt of dc power from source 214 is sufficient to maintain the layer at 80°C. At this temperature approximately 80 percent of the intensity incident on the glass layer is absorbed, i.e., beam 210 has 20 percent of the intensity of incident beam 208. At room temperature, the absorption is reduced to approximately 15 percent of the incident intensity. Reflection losses from beam 212 at the exterior surfaces of the windows will reduce the transmitted beam 210 to approximately 70 percent and 12 percent, respectively. Adjustment of the input power 214 between 0 and 1 watt will thus allow adjustment of the transmission beam 210 intensity between 12–70 percent. The example chosen is for illustrative purposes and is not restrictive to the full range of operation which may extend from 0 – 100 percent.

The operation of the device as an attenuator also illustrates its operation as a modulator since the applied power can be varied with time by modulation source 216 to give a variation in temperature and hence a variation in transmitted intensity.

These examples are described as illustrative of the operation of the semiconductor glass layer as a light valve which can operate as a modulator, attenuator or shutter. Many other arrangements can be devised which carry out the essential functions and only the simplest have been described. Accordingly, it is to be understood that the invention is not to be limited by the specific embodiments described, but only by the scope of the appended claims.

What is claimed and desired to be secured by Letters Patent of the United States is:

1. An optical device comprising:
   a semiconductor glass material which absorbs incident radiation, said material characterized as having a thermally activated dc conductivity, a dc conductivity of at least about $10^{-4}$ohm$^{-1}$cm$^{-1}$, and a relaxation time less than about $10^{-13}$ sec; and
   means for regulating the temperature of said material to effect a predetermined amount of absorption of said incident radiation by means of free-carrier absorption within the glass material.

2. The device of claim 1, wherein said means for regulating temperature includes heat sink means coupled to said material to provide for heat flow therebetween.

3. The device of claim 1, wherein said means for regulating temperature includes heating means operatively associated with said material to regulate the heat flow into said material.

4. The device of claim 1, wherein said material comprises a chalocogenide glass comprising one or more elements from the group consisting of Tl, Se, As and Te.

5. The device of claim 4 wherein said material comprises $Tl_2(Se_xTe_{1-x}) As_2(Se_yTe_{3-y})$ where $x$ varies between 0 and 1 and $y$ varies between 0 and 3.

6. The device of claim 5 wherein said material comprises $Tl_2SeAs_2Te_3$.

7. A method of controlling the intensity of radiation transmitted thru chalcogenide glass comprising the steps of:
   positioning said glass in the path of said radiation; and
   controlling the temperature of said glass to effect the absorption of a predetermined amount of said radiation, the absorption resulting from radiation absorption by free carriers in the glass.

8. A method as in claim 7, said temperature control comprising varying the temperaure with time to effect a modulation of the intensity of the transmitted radiation.

9. A method as in claim 7, said temperature control comprising allowing the temperature to increase by the heat of absorption of said radiation to a level where substantially all of said radiation is absorbed.

* * * * *